United States Patent [19]

Loepfe

[11] 4,189,841
[45] Feb. 26, 1980

[54] METHOD AND DEVICE FOR MEASURING THE VARIATIONS OF THE CROSS-SECTIONAL DIMENSIONS OF A MOVING THREAD-LIKE STRUCTURE

[75] Inventor: Erich Loepfe, Zollikerberg, Switzerland

[73] Assignee: Aktiengesellschaft Gebrüder Loepfe, Zürich, Switzerland

[21] Appl. No.: 945,455

[22] Filed: Sep. 25, 1978

Related U.S. Application Data

[63] Continuation of Ser. No. 775,369, Mar. 7, 1977, abandoned.

[30] Foreign Application Priority Data

Aug. 28, 1976 [CH] Switzerland ............... 10882/76

[51] Int. Cl.² .................... G01B 7/04; G01B 7/06
[52] U.S. Cl. ................... 33/147 L; 33/143 L; 33/147 N; 73/160
[58] Field of Search ............ 33/143 L, 147 L, 147 N, 33/178 E; 73/160; 28/185, 187

[56] References Cited

U.S. PATENT DOCUMENTS

| | | | |
|---|---|---|---|
| 3,000,101 | 9/1961 | Giardino et al. | 33/143 L |
| 3,007,252 | 11/1961 | Mann | 33/178 E |
| 3,106,762 | 10/1963 | Rieva | 73/160 |
| 3,256,610 | 6/1966 | Brys | 33/147 L |
| 3,826,487 | 7/1974 | Forster et al. | 33/147 L |

FOREIGN PATENT DOCUMENTS 952387  11/1956  Fed. Rep. of Germany ........ 33/147 N

*Primary Examiner*—Richard R. Stearns
*Attorney, Agent, or Firm*—Werner W. Kleeman

[57] ABSTRACT

Novel method and device for measuring instantaneous changes of the thickness or diameter of travelling yarns and similar structures. The devices comprise sensing means provided with a pair of members contacting the yarn, with one of the members spring loaded toward the other. The distance or the variation of the distance between the contacting members when the yarn travels is detected by a transducer, e.g. of the capacitive type, and translated into electrical sensing signals.

3 Claims, 20 Drawing Figures

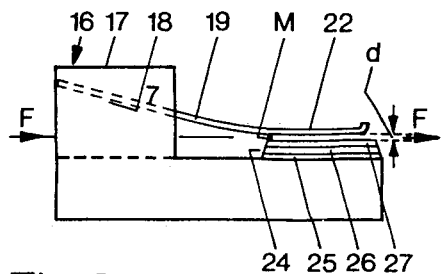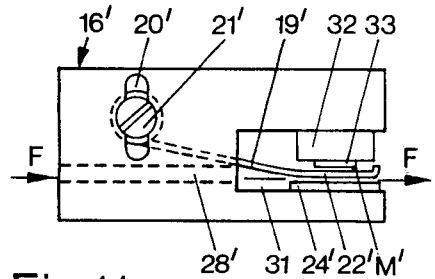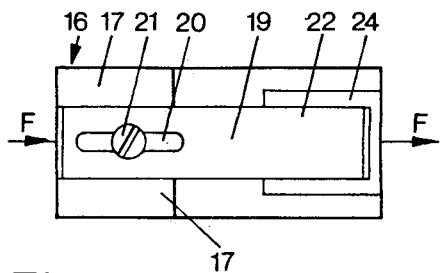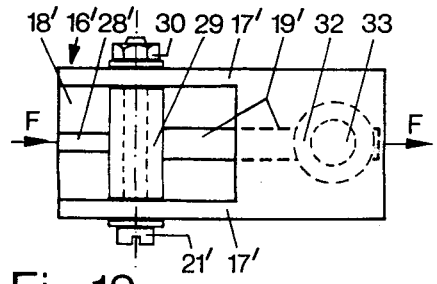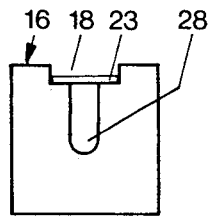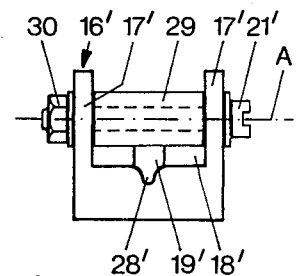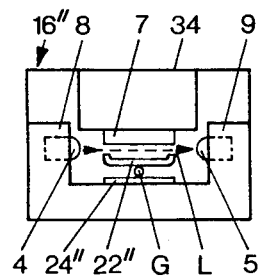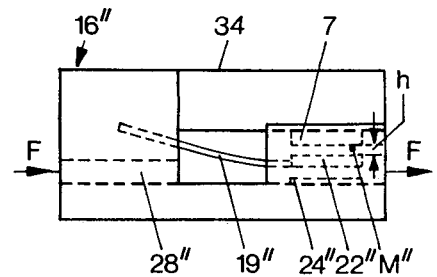

METHOD AND DEVICE FOR MEASURING THE VARIATIONS OF THE CROSS-SECTIONAL DIMENSIONS OF A MOVING THREAD-LIKE STRUCTURE

CROSS-REFERENCE TO RELATED CASE

This is a continuation application of my commonly assigned, copending U.S. application Ser. No. 775,369, filed Mar. 7, 1977, now abandoned.

BACKGROUND OF THE INVENTION

The present invention relates to a novel method and devices for measuring the cross-sectional dimensions of a thread-like or tape-like structure which is moving lengthwise, or variations of said dimensions, by means of a pair of spring-loaded members contacting said structure, and means for continually detecting the mutual distance of the contacting members and generating an electrical sensing signal.

Measuring and testing devices for continually detecting and assessing a cross-sectional dimension, such as the cross-sectional area or diameter of fast travelling textile yarns and other thread-like structures are generally known and in commercial use. Such devices are, by way of example, part of electronic yarn clearers on yarn winding machines which serve for eliminating thick and thin places of the yarn by means of a severing device.

Prior measuring devices of substantially inertialess operation are based on the capacitive or optoelectrical method for detecting the cross-sectional dimension of a travelling yarn. With both of these measuring devices, the sensing signal is dependent not only on the cross-sectional dimension of the yarn, but also on various interferences. With the capacitive method, the result is influenced by the dielectric properties of the yarn material which essentially depend upon the chemical nature and the humidity thereof. With the optoelectrical measuring method, the result is affected by absorption and reflection, in particular the colour of the material.

A so-called eveness tester is known where the yarn passes between a pair of rotatable rollers at a relatively low speed of, e.g., 12 yards per minute. One of the rollers is supported by a pivotable lever which is weight-loaded and thus held toward the other roller by gravity. The pivoting movements of said lever induced by the irregularity of the travelling yarn are transferred to an electromagnetic transducer through a micrometer which serves for zero adjustment. This eveness tester furnishes time average values of the yarn diameter, and thus is not suitable for detecting instantaneous values, in particular of yarns which travel at a high speed of 100 m/min or more. On the other hand, the result of such a measurement is independent of the optical and dielectrical properties of the yarn material.

SUMMARY OF THE INVENTION

It is a primary object of the invention to provide a novel method and devices for measuring instantaneous variations of the cross-section of yarns and other yarn-like or tape-like structures which travel at a high speed.

A further object of the invention is the provision of measuring devices which are not affected by the optical and dielectrical properties of the material of the tested structures.

Another object of the invention is the design of measuring devices which serve for assessing periodic variations of the cross-sectional dimension of rotor yarns, which variations exhibit relatively small amplitudes and thus cannot be measured by known devices, which, however, are disturbing since they produce the so-called Moiré-effect in textile products.

Another object of the invention is the provision of measuring and testing devices which may be used in yarn travel monitors, yarn clearers, yarn eveness testing equipment or thread-break stop motions.

A further more specific object of the invention is a device for detecting the conditions—yarn standstill—and—yarn not present—.

In the following context and claims, the term "measuring device" refers to the whole of the parts serving for mechanically sensing the yarn and generating an electrical sensing signal. The terms "sensor" or "sensing means" are used for the device which serves for sensing the yarn by means of contacting members, and the term "transducer" comprises the parts which detect the movements of the contacting members and translate them into electrical sensing signals.

BRIEF DESCRIPTION OF THE DRAWINGS

The invention will be better understood and objects other than those set forth above will be apparent upon consideration of the following detailed description thereof which makes reference to the annexed drawings wherein:

FIGS. 7, 8 and 9 show a measuring device comprising a capacitive transducer in front view, plan view, and end view, respectively;

FIGS. 10, 11 and 12 are respective front, top and end views of a measuring device comprising an inductive transducer;

FIGS. 13 and 14 show a measuring device in end view and front view, respectively, provided with an optoelectrical transducer;

DETAILED DESCRIPTION OF THE INVENTION

Figure 1:
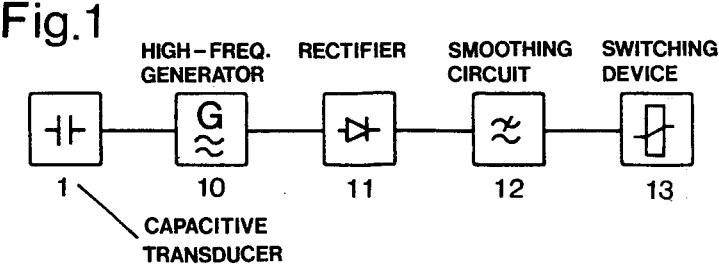
FIGS. 1, 2 and 3 are respective block diagrams of various transducers and associated electronic circuits.

With reference to FIG. 1, a capacitive transducer 1 which is part of a measuring device (not shown) is connected to a resonant circuit (not shown) of a high frequency generator 10 which provides an A.C. voltage in the megahertz frequency range. The output signal of high frequency generator 10 is supplied to a series connection of circuits 11, 12 and 13, where it is rectified in rectifier 11, smoothed in smoothing circuit 12 and delivered to switching device 13, e.g. a relay. Electronic stages such as the circuits 10, 11 and 12 are known in the art and need not be described in detail.

The sensitivity of response of the electronic circuitry shown in FIG. 1 may be adjusted, for a specific yarn travelling through transducer 1, such that switching device 13 is not operated by a normal yarn end, however, is operated by a thick place having a diameter of, e.g., more than 200% of the normal or mean diameter of the yarn. In this event, relay 13 responds and stops the travel of the yarn.

Figure 2:
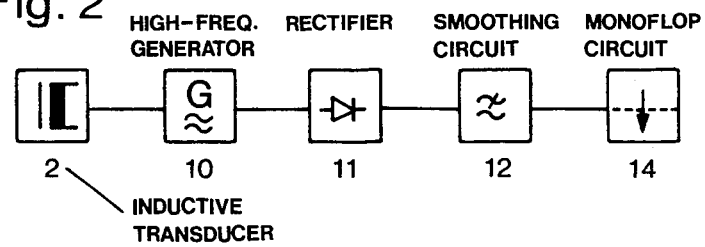

According to FIG. 2, an inductive transducer 2, e.g. an induction coil with a ferrite core, is connected to electronic circuitry 10, 11, 12, 14 which substantially operates in a similar manner as the circuitry illustrated in FIG. 1, however, a mono-flop 14 is provided in the place of relay 13.

Figure 3:
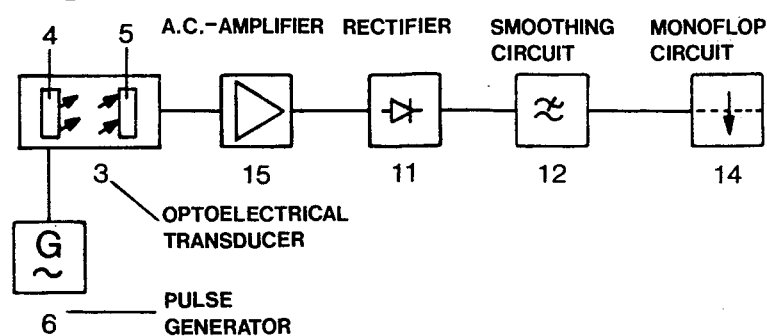

In FIG. 3, an optoelectrical transducer 3 comprises a light source 4, e.g. a light emitting diode, and a photocell 5, e.g. a photodiode. Pulse generator 6 supplies light source 4 with rectangular pulses of a repetition rate in the range of some 10 KHz, e.g. 50KHz. An A.C. amplifier 15 is connected to photocell 5, and the following circuits 11, 12 and 14 are similar to those shown in FIG. 2. Optoelectrical transducer 3 may be arranged for measuring the cross-sectional area of the light beam through which the yarn travels, or for detecting the position of a member contacting the travelling yarn, by means of light reflected from said contacting or contact member.

Figure 4:
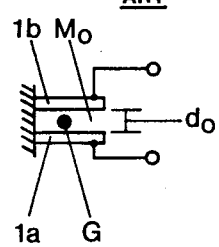
FIGS. 4, 5 and 6 are respective schematic representations of capacitive transducers illustrating both the prior and novel principles of measurement.
Figure 5:
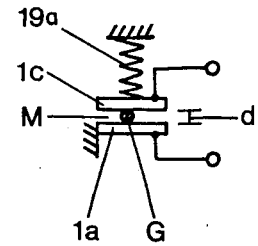
Figure 6:
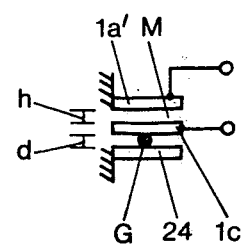

FIGS. 5 and 6 illustrate the principle of measurement of inventive capacitive transducers compared with a known transducer which is shown in FIG. 4.

With reference to FIG. 4, two fixed electrodes 1a, 1b arranged at a mutual distance do constitute a measuring capacitor through which the yarn G travels. Electrodes 1a, 1b form a measuring gap Mo between them. Measuring gap Mo has a fixed volume independent of the volume or diameter of the yarn G. With this known transducer, the changes of the capacitance caused by the irregularity of the travelling yarn G are sensed and measured. Generally, the volume of measuring gap Mo is substantially greater than the volume of the yarn end G contained in gap Mo. With this capacitive transducer, the result of the measurement depends not only on the dimensions, in particular the cross-sectional area of the yarn G, but also on the dielectrical properties thereof, i.e. the material and humidity of the yarn G. Corrections must be made for eliminating these undesired effects.

According to FIG. 5, an inventive capacitive transducer or measuring capacitor comprises a fixed electrode 1a and a movable electrode 1c which is loaded by a pressure spring 19a toward fixed electrode 1a. Electrodes 1a, 1c serve at the same time as members contacting the travelling yarn G, and provide a variable measuring gap M whose width d varies continually with the changes of the cross-sectional dimensions of the travelling yarn G. A certain change of the yarn diameter results in a corresponding proportional change of the volume of measuring gap M, and thus in a much greater absolute and relative change of the capacitance when compared with the known transducer shown in FIG. 4. Thus, the novel capacitive transducer provides for much greater sensitivity of response. Moreover, the effect of the dielectric properties of the yarn G upon the measurement is relatively small, since the yarn G only slightly contributes to the changes of the capacitance which, with this inventive embodiment, are due mostly to the changes of the volume of the variable measuring gap rather than the capacitance of the yarn itself.

The capacitive transducer which is shown in FIG. 5 in schematic representation may additionally be used for detecting the conditions "no yarn present" and "yarn at a standstill". In the former event, electrodes 1a, 1c are short-circuited, in the latter event the irregular A.C. component of the sensing signal indicative of yarn travel disappears. Both conditions may be indicated by known electronic circuitry.

In the structure shown in FIG. 6, the lower gap through which yarn G travels is separate from the capacitive measuring gap M. A fixed lamella 24 which may be made of insulating material, such as ceramic oxide, and a movable spring-loaded electrode 1c are in contact with the travelling yarn G. A fixed counter-electrode 1a' is provided above movable electrode 1c, such that the electrodes 1a', 1c confine a variable measuring gap M. The width h of measuring gap M is not the same as the mutual distance d of contacting or contact members 1c, 24. With this embodiment, the effect of the dielectric properties of yarn G upon the result of the capacitance measurement is entirely eliminated.

In FIGS. 7 through 14 various measuring devices each comprising a sensor and a transducer are represented. With the yarn G travelling through such a measuring device, the deviations of the cross-sectional dimensions of the yarn G induce positional changes of one of the yarn contacting or contact members as mentioned above. Those positional changes are detected by a transducer and translated into electrical sensing signals.

The measuring devices are shown in approximately actual scale in FIGS. 7 through 14. However, the dimensions of these devices are in no way critical and may be accommodated to the desired applications within broad limits.

The embodiment of measuring device represented by FIGS. 7, 8 and 9 comprises a base body 16 which, as shown by the front view of FIG. 7, is substantially L-shaped. A perpendicular extension 17 of base body 16 serves for supporting a thin leaf spring 19 made of elastic metal, such as spring steel, and provided with a longitudinally extending slotted hole 20 through which a fixing screw 21 or equivalent structure is passed which is screwed into extension 17. The latter has a recess 18 for receiving leaf spring 19. The bottom 23 of recess 18 slopes toward the front end 22 of leaf spring 19. Front end 22 represents a first contact member which touches yarn G at the upper side thereof. A rectangular lamella 24 composed of three layers 25, 26, 27 is arranged beneath first contact member 22 and forms a second contact member which may be cemented to the top of base member 16. Lamella 24 comprises a base support 25 which may be made of insulating material, such as ceramics, an electrode 26 applied to base support 25, and a hard protective layer 27 provided on electrode 26.

Electrode 26 may be a metallic lamella or made of sheet material, or applied to base support 26 as a thin metal layer, using known technology. Protective layer 27 may be made preferably of hard material, such as ceramic oxide, and may be applied onto electrode 26 by means of the known process of plasmation.

The front end 22 of leaf spring 19 operates as a counter electrode to electrode 26, and both electrodes form the plates of a capacitor 1, FIGS. 1 and 5, whose capacitance depends upon the distance d between the surface of lamella or contact member 24 and the opposite surface of front end 22. Electrode 26 and counter electrode 22 are connected to high-frequency generator 10, FIG. 1, through lead wires (not shown). The capacitance of capacitor 1 continually changes with the variable distance d between the contact member 22, 24, when a yarn travels through the gap M between electrode 26 and counter electrode 22.

In FIGS. 7 and 8, the path along which the yarn travels is schematically represented by line F—F. A yarn channel 28 of substantially U-shaped cross-section is provided in base body 16, which channel passes through extension 17.

Leaf spring 19 may be made of spring steel of a thickness of about 0.05 mm. The length of leaf spring 19 may be about 40 mm and its width about 10 mm. Due to its small thickness leaf spring 19 has a very low mass and thus a low inertia, enabling the front end 22 to follow the changes of the yarn diameter substantially without inertia. The pressure which leaf spring 19 exerts on the yarn may be of the order of one pond (gram weight).

By means of slotted hole 20 and fixing screw 21 it is possible to adjust leaf spring 19 in its lengthwise direction and thus to change the length of measuring gap M in the direction of yarn travel. Such length may be about 10 mm. Such adjustment of the leaf spring 19 also adjusts the contact pressure of the spring on the travelling yarn.

The design of contacting or contact members 19, 24 shown in FIGS. 7 and 8, where the upper contact member 19 is shaped as a flat leaf spring offers the valuable advantage that the electrical sensing signal is only slightly responsive to the unavoidable traversing movements of the travelling yarn in measuring gap M. This holds true also for the devices shown in the figures to follow. Contrarily, due to lack of homogeneity of the measuring zone, with known optoelectrical and capacitive transducers the traversing movements of the travelling yarn have a relatively great influence upon the sensing signal, which traversing movements cannot be completely avoided even when using tight yarn guides.

The measuring device represented by FIGS. 10, 11 and 12 has a block-shaped base body 16' having a rear recess 18' and a front recess 31. Two side walls 17' arranged on base body 16' to both sides of rear recess 18' are provided with perpendicularly extending slotted holes 20'. Leaf spring 19' has a rear end which is fixed at a cylindrical bearing member 29. The latter is mounted between side walls 17' by means of a support bolt 21' and nut 30 so as to be adjustable in a perpendicular direction and is pivotable about axis A (FIG. 12) of support bolt 21'.

An inductive transducer comprising a coil 32 and a core 33, e.g. a ferrite core, is fixed at the top of front recess 31 adjacent and above the first end 22' of leaf spring 19'. Thus, a measuring gap M' is formed between the front end 22' of leaf spring 19' and core 33. Beneath the front end 22' of leaf spring 19' a lamella 24' of hard material, such as ceramic oxide, is fixed on the bottom of front recess 31. In the bottom of rear recess 18' there is provided a yarn channel 28' extending beneath leaf spring 19' in the longitudinal direction of base body 16'.

As shown in FIG. 2 for the inductive transducer 2, coil 32 may be connected to a high-frequency generator 10 and the thereto connected circuitry 11, 12 and 14. When the thickness of a yarn G passing between lamella 24' and front end 22' of leaf spring 19' changes, said front end 22' is moved up and down in a direction parallel to the axis of induction coil 32. These positional changes induce changes of the high-frequency voltage over coil 32, in a similar manner as with the capacitive transducer illustrated above with reference to FIGS. 1, 7, 8 and 9.

FIGS. 13 and 14 show another measuring device in end view and front view, respectively. Base body 16'' is substantially similar to base body 16 shown in FIGS. 7, 8 and 9, however, additionally provided with extensions 8, 9 and 34 which support the various components 4, 5 and 7, respectively, of an optoelectrical transducer. Leaf spring 19'' has a front end 22'', the edges of which are bent upward such as to form a flat substantially U-shaped cross-section as may be seen from FIG. 13. Above front end 22'' and at a small distance therefrom, there is fixed a shield 7 at shield support 34. Thus, a slot-shaped measuring gap M'' is formed whose width h varies with the position of front end 22' in a perpendicular direction.

A lamella 24'' is fixed on top of base body 16'' beneath the front end 22''. When a yarn G travels between lamella 24'' and front end 22'' of leaf spring 19''', the width h of measuring gap M'' changes in an opposite sense to any change in the cross-sectional dimension of yarn G. The position of shield 7 in perpendicular direction is preferably adjusted such that the width h has a small positive value of one or some tenths of a millimeter for the thickest yarn places to be detected and measured. For this purpose, an adjusting device (not shown) may be provided for shield 7.

For sensing the width of measuring gap M'' there are provided, on both sides thereof, a light source 4, e.g. a light emitting diode, and a photocell 5, e.g. a photodiode or a photo-transistor. The whole of the measuring device is arranged such that ambient light is shielded from photocell 5 insofar as possible.

Also with this embodiment, measuring gap M'' is separated from the zone between contact members 22''', 24'' which is passed by the yarn.

Figure 15:
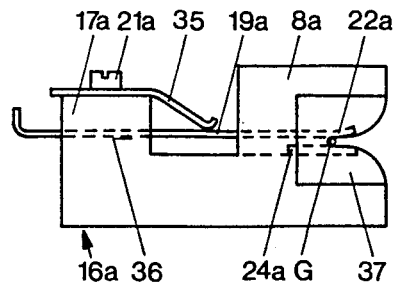
FIGS. 15 and 16 are representations of a sensor in front view and end view, respectively.
Figure 16:
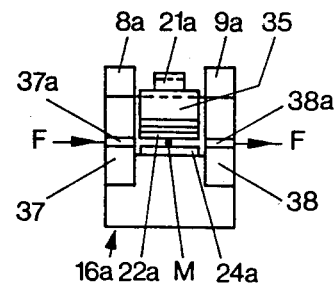

FIGS. 15 and 16 show an embodiment of a sensor or sensing device where the yarn passes through measuring gap M between lamella 24a and the end 22a of leaf spring 19a in a direction transverse to the longitudinal extension of leaf spring 19a. The latter is led through a slotted duct 36 in the rear extension 17a of substantially L-shaped base body 16a so as to be adjustable along its longitudinal extension. In this way it is possible to vary the extension of measuring gap M in a direction transverse to the path F—F of the yarn G. On top of extension 17a there is fixed a pressure spring 35 by means of a fixing screw 21a. Such pressure spring is not indispensable, however, it may be provided for enhancing the pressure which leaf spring 19a exerts in downward direction.

As described above with reference to FIGS. 7 through 9 for lamella 24, lamella 24a may be composed of three layers, one of which forms an electrode of a capacitive transducer.

The front end of base body 16a is provided with two lateral extensions 8a, 9a, each of which bears a yarn guide 37 and 38, respectively. These yarn guides 37, 38 may be made of ceramic oxide, and each has a slot 37a and 38a, respectively, for introducing yarn G into measuring gap M. Thus, the yarn may be automatically threaded into measuring gap M in a direction transverse to yarn path F—F.

Figure 17:
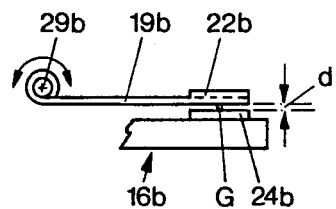
FIGS. 17 and 18 show a modification of the contact members of a sensor in front view and end view, respectively.
Figure 18:
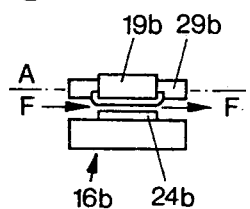

FIGS. 17 and 18 represent an arrangement of contacting or contact members 19b, 24b of a sensor which is somewhat similar to the one shown in FIGS. 15 and 16. A lamella 24b fixed at base body 16b forms one of the contact members. Lamella 24b may be composed of three layers as is lamella 24, FIG. 7. Leaf spring 19b is attached to a bearing bolt 29b which is rotatable about axis A. The front end 22b of leaf spring 19b has a flat substantially U-shaped cross-section and forms the other contact member. The yarn path F—F extends in the transverse direction to the longitudinal extension of leaf spring 19b.

By rotating leaf spring 19b about axis A, front end 22b may be lifted from lamella 24b for the purpose of cleaning and checking and, moreover, the contact pressure exerted by front end 22b may be regulated within a broad range by such rotation. Thus, it is also possible to adjust the mutual distance d of contact members 22b, 24b within wide limits, for accommodation to the cross-sectional dimensions of the respective yarn G, so that very thin as well as very thick yarns can be measured.

Figure 19:
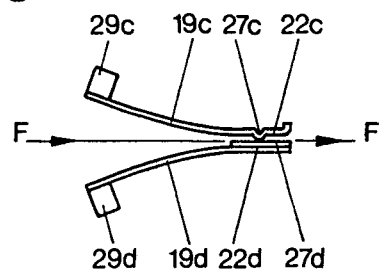
FIGS. 19 and 20 show still another modification of the contact members of a sensor.
Figure 20:
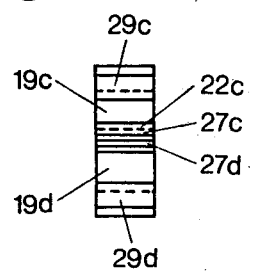

With reference to FIGS. 19 and 20, a specific modification of the contact members of a sensing device comprises two leaf springs 19c, 19d whose front ends 22c, 22d contact the yarn. By way of example, one of these contact members 19c may be mounted fixedly, the other 19b rotatably at a base body (not shown). For the purpose of mounting, bearing members 29c and 29d are attached to the rear ends of leaf springs 19c and 19d, respectively. In order to protect the upper or inner surface of the front end 22d against abrasion by the travelling yarn, said surface is provided with a protective layer 27d which may consist of ceramic oxide or other hard material and may be applied by plasmation. For the sake of clarity in illustration protective layer 27b is reproduced in FIGS. 19 and 20 on a scale substantially larger than the scale of the other parts. The front end 22c of leaf spring 19c has a transverse corrugation 27c so as to contact the front end 22d of the opposite leaf spring 19d or the protective layer 27d thereof along a line extending in the transverse direction of yarn path F—F. By this structure it is possible to also detect very short thick places of a yarn, such as knots and slubs, even when the yarn travels very fast. This means that the electrical sensing signal exhibits a high time resolution.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A device for measuring a transverse dimension of a longitudinally travelling yarn, comprising sensing means including two opposite contacting members for contacting the travelling yarn, means for transducing instantaneous variations of the mutual distance of said contacting members into electrical sensing signals, at least one of the contacting members comprising a leaf spring having a free end arranged in opposite relationship to the other contacting member such as to form a measuring gap between said free end and the other contacting member and to exert contact pressure onto the travelling yarn, mechanical means adjoined to the leaf spring for adjusting the contact pressure, the sensing means further comprising a base body, said other contacting member being fixedly arranged at the base body, and said adjusting means comprising means for pivotably mounting said leaf spring at the base body.

2. A device for measuring a transverse dimension of a longitudinally travelling yarn, comprising sensing means including a base body and two opposite contacting members for contacting the travelling yarn, means for transducing instantaneous variations of the mutual distance of said contacting members into electrical sensing signals, at least one of the contacting members comprising a leaf spring having a free end arranged in opposite relationship to the other contacting member such as to form a measuring gap between said free end and the other contacting member and to exert contact pressure onto the travelling yarn, and mechanical means adjoined to the leaf spring for adjusting the contact pressure, and said mechanical adjusting means comprises means for shifting said leaf spring along its lengthwise axis.

3. A device for measuring a transverse dimension of a longitudinally travelling yarn, comprising sensing means including a base body and two opposite contacting members for contacting the travelling yarn, means for transducing instantaneous variations of the mutual distance of said contacting members into electrical sensing signals, at least one of the contacting members comprising a leaf spring having a free end arranged in opposite relationship to the other contacting member such as to form a measuring gap between said free end and the other contacting member and to exert contact pressure onto the travelling yarn, and mechanical means adjoined to the leaf spring for adjusting the contact pressure, the sensing means further comprising a base body, said other contacting member being fixedly arranged at the base body, said mechanical adjusting means comprising means for mounting said leaf spring at the base body, said leaf spring being transversely bent, said mechanical adjusting means further comprising an inclined portion of said base body, said leaf spring being adjustably movable along said inclined portion to adjust the contact pressure on the travelling yarn.

* * * * *